May 24, 1955 R. W. SITLER Re. 24,009

LOCKING KEY FOR ADJOINING CABINET UNITS

Original Filed May 9, 1952

Inventor
RICHARD W. SITLER by Hill, Sherman, Meroni, Gross & Simpson
Attys.

United States Patent Office

Re. 24,009
Reissued May 24, 1955

24,009

LOCKING KEY FOR ADJOINING CABINET UNITS

Richard W. Sitler, St. Charles, Ill., assignor to Aurora Equipment Company, Aurora, Ill., a corporation of Illinois Original No. 2,675,287, dated April 13, 1954, Serial No. 286,933, May 9, 1952. Application for reissue December 20, 1954, Serial No. 476,613

4 Claims. (Cl. 312—111)

Matter enclosed in heavy brackets [ ] appears in the original patent but forms no part of this reissue specification; matter printed in italics indicates the additions made by reissue.

This invention relates to attaching means for shelving or cabinet units to hold them together in alignment and more particularly to a simple key which may be inserted in aligned openings in end members of the units and which upon turning will lock the units together.

An object of this invention is to provide improved means for attaching or keying together cabinet units such as shelving and the like either in vertical or horizontal alignment.

In accordance with the general features of this invention there is provided attaching means for cabinet units such as shelving and the like including end members provided with pairs of spaced openings such as keyhole-shaped holes and capable of alignment or inter-registration, the attaching means being insertable into the registered openings to position fixedly and hold together said units by frictional camming engagement with the margins of said members defining said openings, each of said attaching means comprising a substantially flat key inserted lengthwise through said aligned openings and turned therein with portions in said openings and with edges in engagement with opposite outer side surfaces of said members.

Other objects and features of this invention will more fully appear from the following detailed description taken in connection with the accompanying drawings which illustrate a preferred embodiment and in which.

As shown on the drawing.

Figure 1:
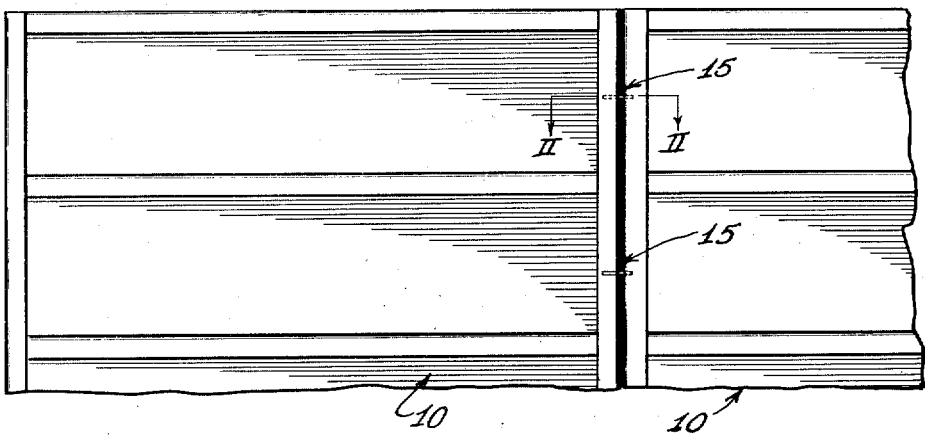
Figure 1 is a fragmentary front view of a pair of cabinet or shelf units held together end to end by my novel key means.

The reference character 10 designates generally a unit which may be of the cabinet or shelf type and is of a well-known construction in the steel shelving or cabinet field. Any number of these units may be secured together end to end or stacked upon each other by my novel key means and as illustrative of the invention I have shown two such units in Figure 1 secured together.

Each unit 10 includes an angular end supporting member having flanges 11 and 12. The flanges 11 and 12 each has a given size opening 13 which may be of any desired shape such as a keyhole-shaped opening with converging side margins and which in the embodiment of this invention extends vertically although it could be located in any desired position or at any desired angle.

Figure 2:
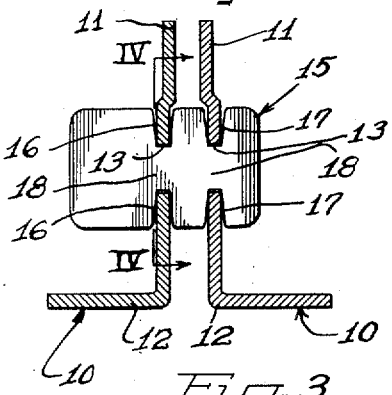
Figure 2 is a cross sectional view taken on substantially the line II—II of Figure 1 looking downwardly.

The opening in one flange 11 is so positioned as to be registerable with or aligned with the corresponding opening in the adjoining end member as shown in Figure 2.

Figure 3:
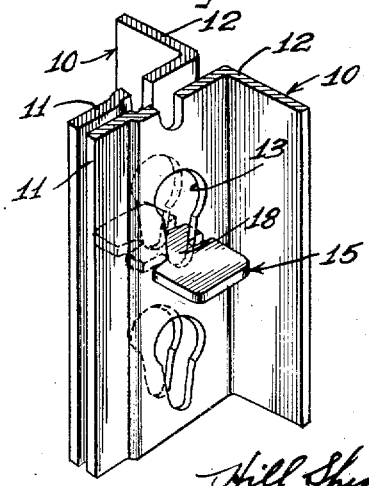
Figure 3 is a fragmentary perspective view of end members of my units showing a key in the aligned openings and turned into interlocking position.

Cooperable with these aligned openings 13 for interlocking the end members of the units together are a plurality of key means each of which comprises a substantially flat steel key 15. *The key is made of substantially flat stock having greater width than thickness (Figure 3).* This key 15 has spaced pairs of slots 16 and 17 in its edges and each pair defines a reduced section 18 between the slots.

Figure 4:
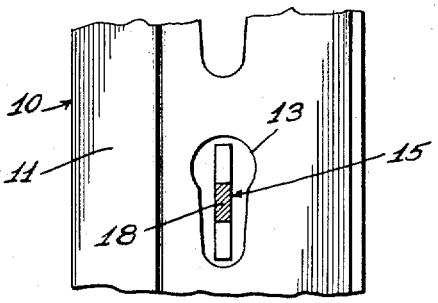
Figure 4 is a fragmentary view partly in section taken on the line IV—IV of Figure 2 showing the key inserted lengthwise in the aligned openings prior to turning in interlocking engagement.
Figure 5:
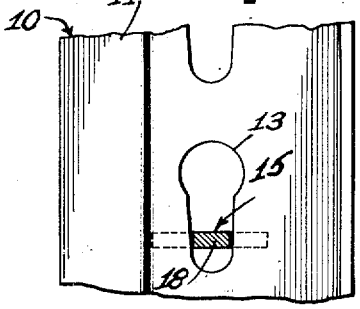
Figure 5 is a view similar to Figure 4 showing the position of the key after it has been turned into interlocking position.

In the use of the key it is inserted lengthwise as shown in Figure 4 through the openings 13 until its reduced sections 18—18 are in the aligned openings 13. Then upon turning of the key its slots receive the edges of the marginal portions of the aligned openings so that the edges of the key are brought into engagement with opposite side surfaces of the flanges 11 of the end supporting members of the units. When in this position, as shown in Figure 5, the units are tightly cammed together and are held by the key 15 which can be easily removed when it is desired to separate the cabinets.

I claim as my invention:

1. In combination cabinet units each having supporting members provided with aligned pairs of spaced openings and capable of inter-registration and attaching means insertable into the registered openings in said members to position fixedly said units in spaced relation by frictional camming engagement with edges of the openings, each of said attaching means comprising a substantially flat slotted edge key inserted lengthwise through said aligned openings and turned therein with slotted edge portions in said openings and in camming engagement with opposite side surfaces of said members.

2. In combination cabinet units each having supporting members provided with aligned pairs of spaced key receiving openings capable of inter-registration and attaching means insertable into the registered openings in said members to position fixedly said units in spaced relation by frictional camming engagement with margins of said openings, each of said attaching means comprising a substantially flat key having spaced pairs of slots providing reduced sections between the pairs of slots, said key being inserted lengthwise through said aligned openings and being turned with the edges of its slots cammingly engaging opposite side surfaces of said members with each reduced section being disposed in one of said aligned openings.

*3. In combination, units such as cabinets or shelving, each having supporting members provided with aligned pairs of spaced openings and capable of inter-registration and attaching means insertable into the registered openings in said members to position fixedly said units in spaced relation by frictional camming engagement with edges of the openings, each of said attaching means comprising a slotted edge key substantially of greater width than thickness and inserted lengthwise through said aligned openings and turned therein with each bottom slot edge in an opening, and with slot side edges in camming engagement with opposite side surfaces of said members.*

*4. In combination, units such as cabinets or shelving, each having supporting members provided with aligned pairs of spaced key receiving openings capable of inter-registration and attaching means insertable into the registered openings in said members to position fixedly said units in spaced relation by frictional camming engagement with margins of said openings, each of said attaching means comprising a key of greater width than thickness and having spaced pairs of slots in its edges provid-*

*ing sections of reduced width between the pairs of slots, said key being inserted lengthwise through said aligned openings and being turned with the edges of its slots cammingly engaging opposite side surfaces of said members with each reduced section being disposed in one of said aligned openings.*

References Cited in the file of this patent or the original patent

UNITED STATES PATENTS

| | | |
|---|---|---|
| 1,127,488 | Morris | Feb. 9, 1915 |
| 1,423,861 | Levene | July 25, 1922 |
| 2,604,213 | Bales | July 22, 1952 |
| 2,651,489 | Bell | Sept. 8, 1953 |